United States Patent [19]

Shigeeda

[11] Patent Number: 5,191,604
[45] Date of Patent: Mar. 2, 1993

[54] COMMUNICATION APPARATUS WITH PRIVATE BRANCH EXCHANGE FOR COMMUNICATING WITH EXTENSION OR EXTERNAL STATIONS

[75] Inventor: Nobuyuki Shigeeda, Saitama, Japan

[73] Assignee: Fuji Xerox Co., Ltd., Tokyo, Japan

[21] Appl. No.: 777,617

[22] Filed: Oct. 16, 1991

[30] Foreign Application Priority Data

Oct. 24, 1990 [JP] Japan .................................. 2-284378

[51] Int. Cl.⁵ ..................... H04M 1/00; H04M 11/00; H04M 3/42; H04M 3/00
[52] U.S. Cl. ................................. 379/161; 379/100; 379/156; 379/210; 379/216; 379/355
[58] Field of Search ............... 379/100, 156, 210, 211, 379/272, 273, 274, 216, 161, 45, 49, 355

[56] References Cited

U.S. PATENT DOCUMENTS 4,564,724 1/1986 Nakayama et al. .................... 379/67
4,575,584 3/1986 Smith et al. .......................... 379/279
4,825,463 4/1989 Miura ................................. 379/355

Primary Examiner—James L. Dwyer
Assistant Examiner—Harry S. Hong
Attorney, Agent, or Firm—Finnegan, Henderson, Farabow, Garrett and Dunner

[57] ABSTRACT

A communication apparatus includes an extension-line connector to be connected to a private branch exchange, an external-line connector to be connected to external lines, and a plurality of independently operable communication control units. When an attempt to perform a communication with an external station is made in a situation in which the external-line connector is already being used for a communication with another external station, the attempted communication with the external station is effected via one of the plurality of communication control units which is not in use, the extension-line connector, and the private branch exchange.

11 Claims, 4 Drawing Sheets

| EXTENSION/EXTERNAL-LINE IDENTIFICATION CODE | TELEPHONE NUMBER |
|---|---|

COMMUNICATION APPARATUS WITH PRIVATE BRANCH EXCHANGE FOR COMMUNICATING WITH EXTENSION OR EXTERNAL STATIONS

BACKGROUND OF THE INVENTION

The present invention relates to a communication apparatus, typically a facsimile apparatus. More specifically, the invention relates to a communication apparatus which has an extension-line connector to be connected to a private branch exchange and an external-line connector to be connected to external lines, and which is capable of communicating separately with extension station and external station.

There have conventionally been proposed facsimile apparatuses which are provided with two sets of communication control units and an extension-line connector and an external-line connector so as to be able to separately communicate with an external station and extension station. Hereinafter, a brief description will be given of such a facsimile apparatus.

FIG. 1 is a block diagram of such a facsimile apparatus. In the drawing, thick arrows indicate a flow of data, while thin arrows indicate a flow of a control signal.

A scanner 1 and a printer 2 are connected to a data control unit 3, which is connected to a bus 4. Two sets of communication control units 5A, 5B are connected to an NCU 8 via a distributor 7, and also to the bus 4.

The NCU 8 is provided with an extension-line connector 15 to be connected to a PBX (private branch exchange) 19 and an external-line connector 16 to be connected to external lines. The NCU 8 is adapted to send a call via the external-line connector 16 usually.

The communication control units 5A and 5B are respectively provided with buffers 12A and 12B, data companders 13A and 13B, and buffers 14A and 14B, and are adapted to compress image information to be transmitted which is transferred from the scanner 1 or a large-capacity memory 9 or expand image information received via the NCU 8 and the distributor 7, in accordance with a prescribed method.

The large-capacity memory 9 for storing image information to be transmitted or image information received and a system control unit 10 for controlling the facsimile apparatus are also connected to the bus 4.

The system control unit 10 has an abbreviated-dialing-number storage means 10A in which abbreviated dialing numbers for use in calling an external station via the external-line connector 16 are registered.

Connected to the system control unit 10 is a panel 11 which is provided with an extension button 11A for accessing the PBX 19 by selecting the extension-line connector 15, abbreviated-dialing buttons 11B for sending a call to an external station using an abbreviated dialing number, a ten-key pad 11C for dialing, and other various operating means, various display units, etc.

FIG. 2 shows the operation of the facsimile apparatus having the above-described arrangement in the case where an attempt is made to communicate with an external station by operating one of the abbreviated-dialing buttons 11B when a communication is already being carried out with another external station via the external-line connector 16.

In FIG. 2, if it is first judged in Step S1 that one of the abbreviated-dialing buttons 11B has been depressed, it is judged in Step S2 whether or not a communication is already going with an external station via the external-line connector 16.

If a communication is being conducted with no external stations, the external-line connector 16 is selected in Step S3, a dialing number which has been selected by the abbreviated-dialing button 11B is read out from the abbreviated-dialing-number storage means 10A in Step S5, and a call is initiated.

Then, in Step S6, either of the communication control units 5A, 5B which is not being used for any communication is selected, and is connected to the call-initiated external station.

If it is judged in Step S2 that a communication is going with an external station, it is judged in Step S7 whether or not a predetermined time has elapsed. After the lapse of that time, the processing returns to Step S2, and it is again judged whether or not a communication is being made with an external station. If a communication is not being made with any external stations, the external-line connector 16 is selected and a call is initiated.

However, the above-described prior art apparatus has the following problem. If an attempt is made to communicate with an external station when a communication is already going with another external station via the external-line connector 16, the attempt is placed in a waiting state until the communication started earlier is completed.

SUMMARY OF THE INVENTION

The present invention has been made to solve the above problem and, therefore, it is an object of the invention to provide a communication apparatus which is capable of immediately starting communication with an external station without waiting for the completion of an earlier communication with another external station via an external-line connector.

The present invention is characterized in that when an instruction is given to make a communication with an external station, it is first judged whether or not a communication is already being conducted with another external station via an external-line connector, and if another communication is going, a communication control means not being used for any communication and a call-initiating means are automatically connected to an extension-line connector, and an instruction for an external-line connection such as a number "0" is sent to a private branch exchange.

DESCRIPTION OF THE PREFERRED EMBODIMENTS

The present invention will be described in detail with reference to the accompanying drawings.

The construction of a first embodiment of the invention will be described with reference to FIG. 1 which was used to explain the conventional apparatus. In this embodiment, as shown in FIG. 3, an abbreviated dialing number to be stored in an abbreviated-dialing-number storage means 10A consists of a code for specifying whether a communication is directed to an extension or external station (hereinafter referred to as "extension-/external-line identification code") and a telephone number of a party to be called.

Figure 1:
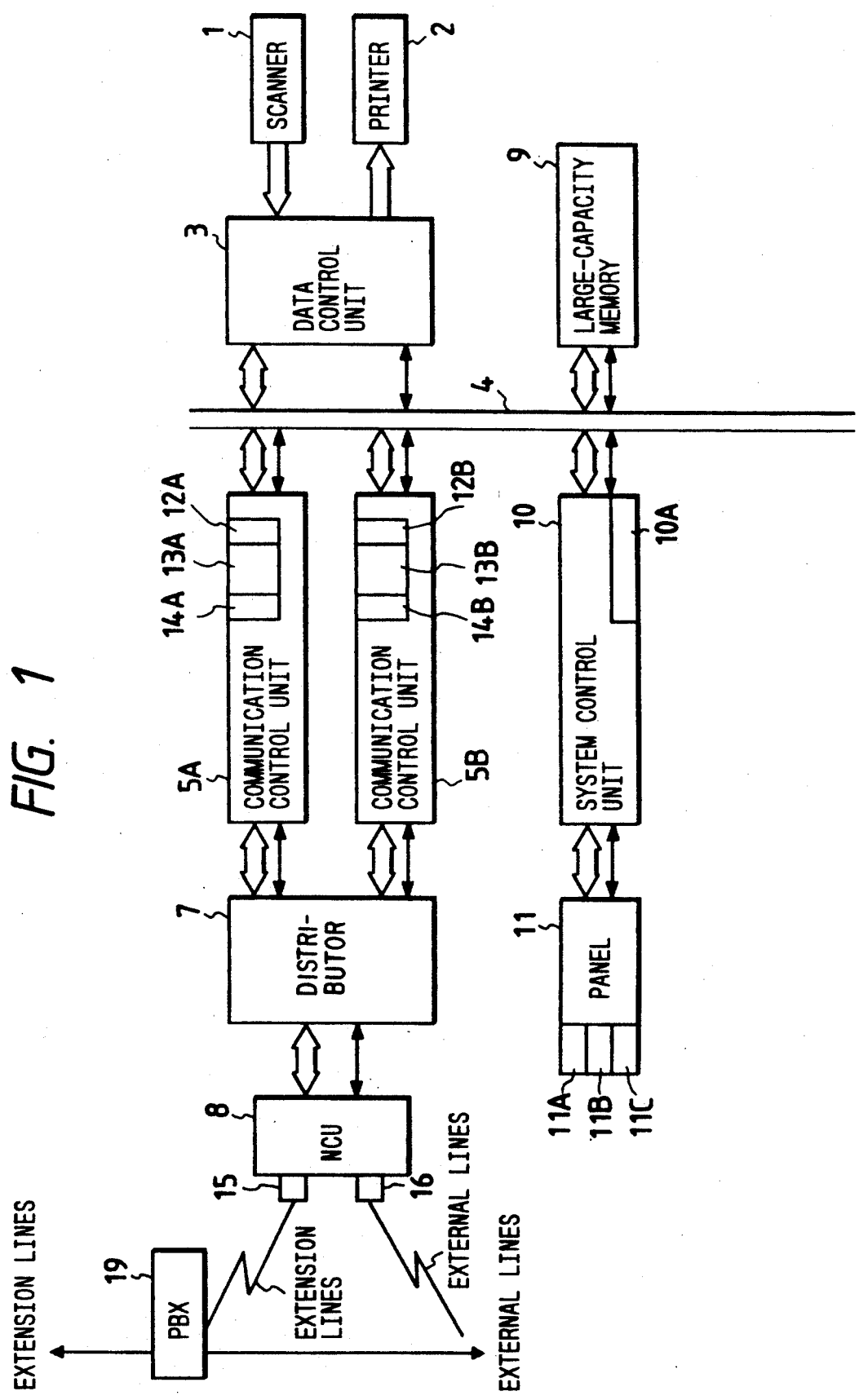
FIG. 1 is a block diagram used for describing not only a conventional facsimile apparatus but also a facsimile apparatus according to a first embodiment.
Figures 2, 3:
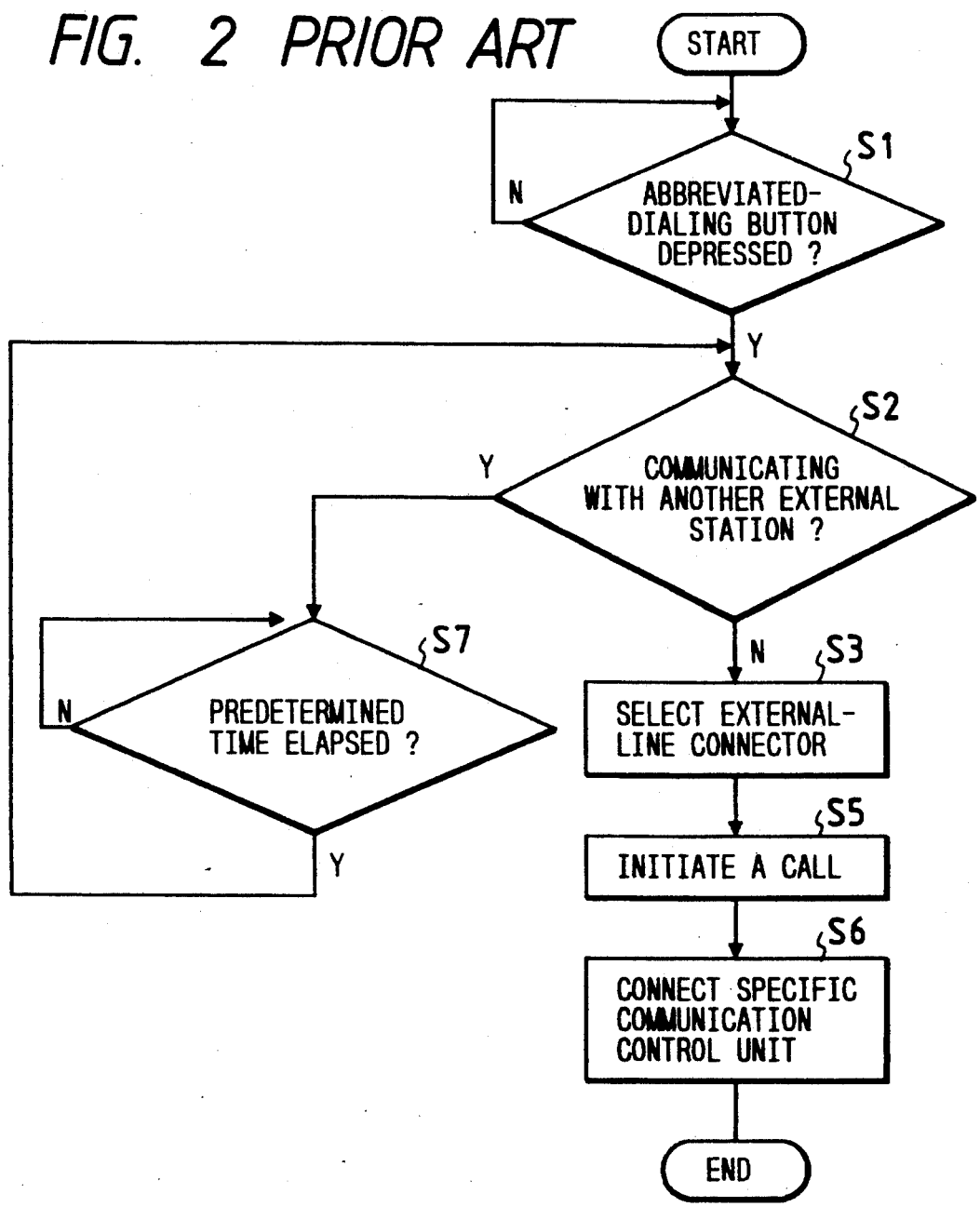
FIG. 2 is a block diagram showing the operation of the conventional apparatus of FIG. 1.
FIG. 3 is a diagram showing the construction of an abbreviated dialing number stored in an abbreviated-dialing-number storage means according to embodiments of the present invention.

In addition, the apparatus of the first embodiment is further characterized in functions of a system control unit 10 shown in FIG. 1.

Figure 4:
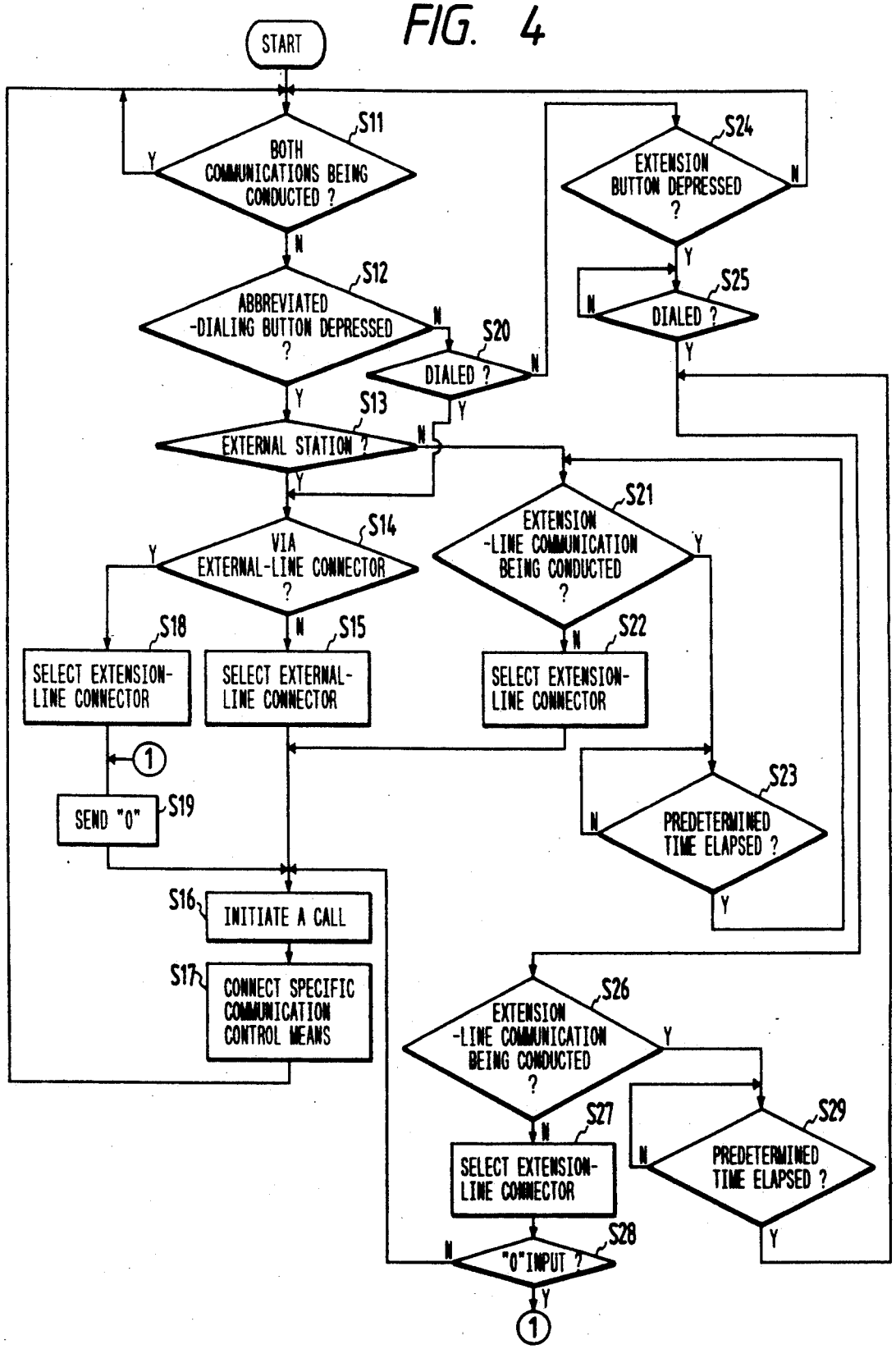
FIG. 4 is a flowchart showing the operation of a facsimile apparatus according to the first embodiment of the invention.

FIG. 4 is a flowchart illustrating the operation of the apparatus of the first embodiment.

First, in Step S11, it is judged whether or not both communications, i.e., communications with an extension station and an external station are conducted concurrently.

If both communications are not going at the same time, it is judged in Step S12, S20 and S24 whether or not one of the abbreviated-dialing buttons 11B has been depressed, whether or not dialing has been made using the ten-key pad 11C, and whether or not the extension button has been depressed, respectively, according to the progress of the processing.

Where one of the abbreviated-dialing buttons 11B has been depressed, an abbreviated dialing number corresponding to the depressed abbreviated-dialing button is read out from the abbreviated-dialing number storage means 10A. Then, in Step S13, it is judged from the extension/external-line identification code of the read-out abbreviated dialing number whether the communication is directed to an external station or an extension station.

If the communication is directed to an external station, it is judged in Step S14 whether or not it is via the external-line connector 16. If it is not a communication via the external-line connector 16, the connector 16 is selected in Step S15, and a call is initiated in Step S16.

Then, in Step S17, one of communication control means (means corresponding to the communication control units 5A, 5B) which is not being used for any communication is selected, and is connected to the call-initiated external station. Subsequently, the processing returns to Step S11.

Where it is judged in Step S14 that the external-line communication is going via the external-line connector 16, the extension-line connector 15 is selected in Step S18, and the PBX 19 is accessed. Then in Step S19, an instruction, e.g., a number "0", is sent to the PBX 19 to effect an external-line connection processing. Subsequently, in Step S16, a call is initiated.

If it is judged in Step S13 that the communication is directed to an extension station, it is judged in Step S21 whether or not a connection to another extension station has already been established via the extension-line connector 15. If a connection has not been established, the extension-line connector 15 is selected in Step S22, and the processing proceeds to Step S16.

If it is judged in Step S21 that a connection to another extension line has already been established, it is judged in Step S23 whether or not a predetermined time has elapsed. After the lapse of the predetermined time, the processing returns to Step S21.

Where it is judged in Step S20 that dialing has been made, the processing proceeds to Step S14.

Where it is judged in Step S24 that the extension button 11A has been depressed, then it is judged in Step S25 whether or not dialing has been made.

If dialing has been made, it is judged in Step S26 whether or not a connection to another extension line has already been established. If a connection has not been established, the extension-line connector 15 is selected in Step S27.

In Step S28, it is judged whether or not the "0" key has been depressed prior to the telephone number dialing to effect a "0" transmission. Then, if the "0" key has been depressed, the processing proceeds to Step S19. If the "0" key has not been depressed, i.e., if only the telephone number of a party to be called has been input, the processing proceeds to Step S16.

If it is judged in Step S26 that a connection to another extension station has already been established, then it is judged in Step S29 whether or not a predetermined time has elapsed. After the lapse of the predetermined time, the processing returns to Step S26.

Figure 5:
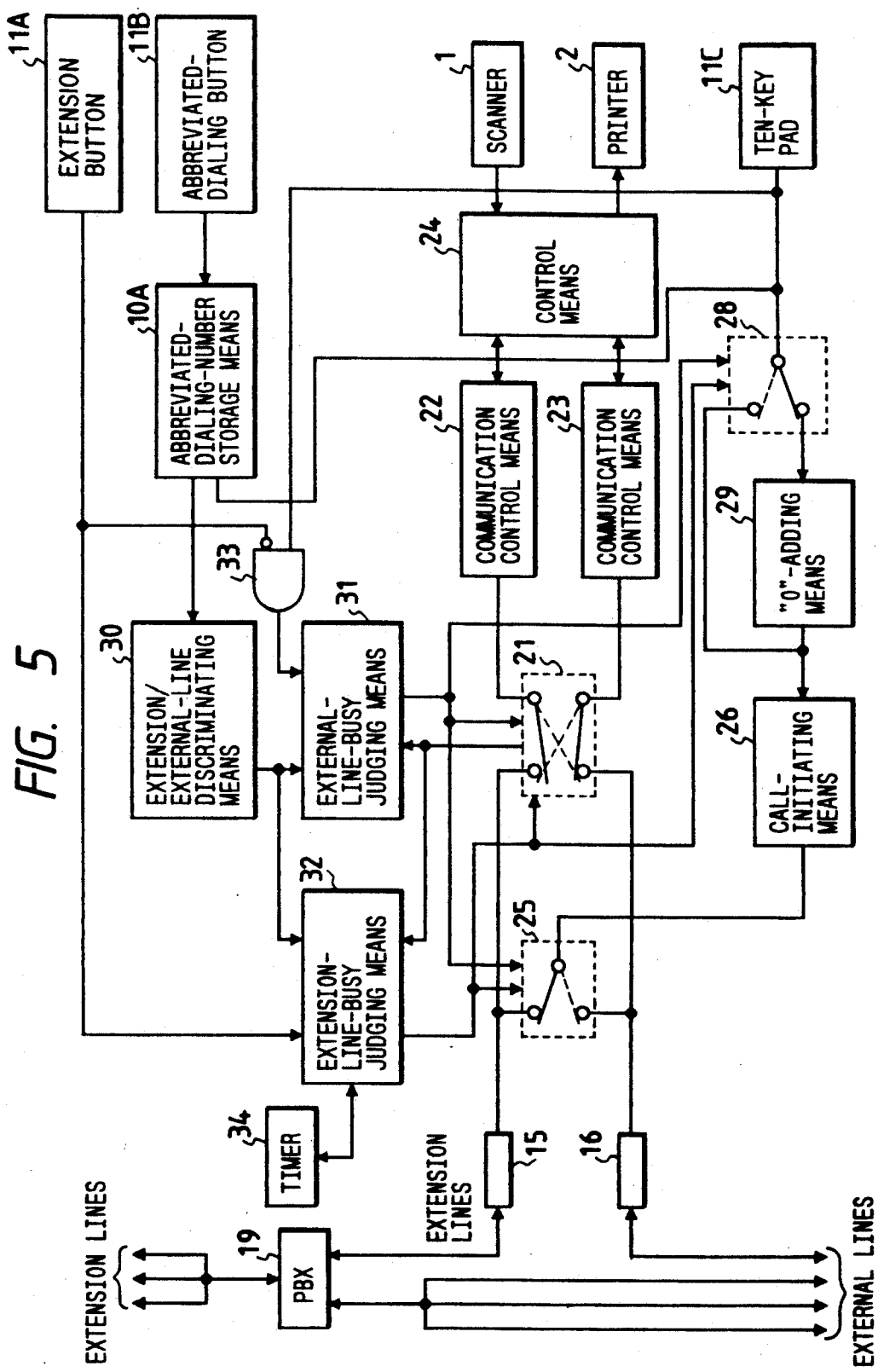
FIG. 5 is a block diagram showing a facsimile apparatus according to a second embodiment of the invention.

FIG. 5 is a block diagram showing a facsimile apparatus according to a second embodiment of the invention. In FIG. 5, the same reference numerals as those in FIG. 1 denote identical or equivalent parts.

In FIG. 5, communication control means 22, 23 are adapted to operate independently, and respectively correspond to the communication control units 5A, 5B in FIG. 1. At the time of a first communication, either one of the communication control means 22, 23 is selected. If an attempt is subsequently made to perform another communication, the other one is selected.

A control means 24 transfers image information read by a scanner 1 to the communication control means 22 or 23, and transfers to a printer 2 image information transferred from the communication control means 22 or 23.

A switching means 21 connects the communication control means 22 and 23 independently to the extension-line connector 15 or the external-line connector 16.

A switching means 25 connects a call-initiating means 26 to the extension-line connector 15 or the external-line connector 16.

Where the facsimile apparatus is to effect a communication at the first time (i.e., where no communication has been conducted via the communication control means 22, 23), the control means 24 connects the call-initiating means 26 to the extension-line connector 15 or the external-line connector 16, and connects one of the communication control means 22, 23 to the extension-line connector 15 or the external-line connector 16. After a communication via the communication control means 22 or 23 is completed, the control means 24 activates the switching means 21 to release the communication control means 22 or 23 from the extension-line connector 15 or the external-line connector 16.

If one of abbreviated-dialing buttons 11B is depressed, an abbreviated dialing number corresponding thereto is read out from the abbreviated-dialing-number storage means 10A. The extension/external-line identification code (see FIG. 3) of this abbreviated dialing number is transferred to an extension/external-line discriminating means 30 to discriminate whether a communication is directed to an external station or an extension station.

If a communication is directed to an external station, an external-line-busy judging means 31 is activated. The external-line-busy judging means 31 judges whether or not the switching means 21 is connecting the external-line connector 16 to the communication control means 22 or 23 (i.e., whether or not the communication control means 22 or 23 is communicating (busy) with an external station via the external-line connector 16).

If the external-line-busy state is detected, the external-line-busy judging means 31 activates the switching means 21 to connect the communication control means 22 or 23 (one which is not used for any communication is selected) to the extension-line connector 15, activates the switching means 25 to connect the call-initiating means 26 to the extension-line connector 15, and activates a switching means 28 to connect the abbreviated-dialing-number storage means 10A to a "0"-adding means 29.

The "0"-adding means 29 adds "0" to the head of a telephone number of a party to be called, which is output from the abbreviated-dialing-number storage means 10A. The "0"-added telephone number is transferred to the call-initiating means 26. The call-initiating means 26 send "0" to the PBX 19, and initiates a call to an external station.

Where the external-line-busy judging means 31 has not detected the external-line-busy state, the external-line-busy judging means 31 activates the switching means 21 to connect the communication control means 22 or 23 to the external-line connector 16, activates the switching means 25 to connect the call-initiating means 26 to the external-line connector 16, and activates the switching means 28 to connect the abbreviated-dialing-number storage means 10A directly to the call-initiating means 26 instead of connecting the same to the "0"-adding means 29. As a result, the call-initiating means 26 directly initiates a call to an external station.

Where the extension/external-line discriminating means 30 has judged that a communication is directed to an extension station, an extension-line-busy judging means 32 is activated.

This extension-line-busy judging means 32 judges whether or not the switching means 21 is connecting the extension-line connector 15 to the communication control means 22 or 23 (i.e., the communication control means 22 or 23 is communicating (busy) with an extension station via the extension-line connector 15).

If the extension-line-busy judging means 32 has detected the extension-line-busy state, it activates a timer 34. After a measurement of a predetermined time is completed, the extension-line-busy judging means 32 is again activated. If the extension-line-busy state is finished, the extension-line-busy judging means 32 activates the switching means 21 to connect one of the communication control means 22, 23 which is not in use to the extension-line connector 15, activates the switching means 25 to connect the call-initiating means 26 to the extension-line connector 15, and activates the switching means 28 to connect the abbreviated-dialing-number storage means 10A directly to the call-initiating means 26.

As a result, the call-initiating means 26 initiates a call to an extension station via the PBX 19.

Where, instead of the abbreviated-dialing buttons 11B, the ten-key pad 11C has been operated to input a telephone number of an external station, the external-line-busy judging means 31 is activated via an AND gate 33. Then, depending on whether the external-line-busy state is detected, the communication control means 22 or 23 and the call-initiating means 26 are connected to the extension-line connector 15 or the external-line connector 16 by the external-line-busy judging means 31.

Further, the switching means 28 is controlled, as described above, depending on whether the extension-line connector 15 or the external-line connector 16 has been selected. That is, where the extension-line connector 15 has been selected, output data (a telephone number of a party to be called) of the ten-key pad 11C is provided to the call-initiating means 26 via the "0"-adding means 29. As a result, "0" is added to the head of a telephone number of a party to be called. A call to an external station is initiated after "0" is sent to the PBX 19. On the other hand, where the external-line connector 16 has been selected, output data of the ten-key pad 11C is provided directly to the call-initiating means 26.

Where the extension button 11A has been depressed before a telephone number of a party to be called is input by means of the ten-key pad 11C, the AND gate 33 is closed to prohibit the activation of the external-line-busy judging means 31 and, instead, the extension-line-busy judging means 32 is activated. As a result, if the extension-line-busy state is not detected, the communication control means 22 or 23 is connected to the extension-line connector 15, while the call-initiating means 26 is connected to the extension-line connector 15. Then, the switching means 28 is activated to directly provide a telephone number of a party to be called which is output from the ten-key pad 11C to the call-initiating means 26, and a call to an extension station is initiated. On the other hand, if the extension-line-busy state is detected, the extension-line-busy judging means 32 is activated again after a predetermined time is measured by the timer 34. When the extension-line-busy state is released, a call to an extension station is initiated after the above-described connections are established.

The present invention is basically characterized in that when an instruction is given to effect a communication with an external station, and if the apparatus is in the external-line-busy state, a connection to the extension-line connector 15 is automatically established and a connection to an external station is established using "0" transmission, etc. Accordingly, the other arrangements may take any form.

If the abbreviated-dialing-buttons 11B are used only for calling external stations, the extension/external-line identification code need not be stored in the abbreviated-dialing-number storage means 10A.

Although the above embodiments are directed to a facsimile apparatus, it is noted that the invention is not limited thereto but applicable to other communication apparatuses.

As described above, in accordance with the present invention, where a communication is being conducted with an external station via an external-line connector, a call to another external station is automatically performed via an extension line, i.e., a private branch exchange. Therefore, it is not necessary to wait for completion of the communication started earlier.

What is claimed is:

1. A communication apparatus comprising an extension-line connector connected to a private branch exchange, an external-line connector connected to external lines, and a plurality of independently operable communication control units, said communication apparatus further comprising:

means for making a first judgment of whether there exists an attempt to conduct a first communication with a first external station;

means for making a second judgment of whether a second communication is being conducted with a second external station via the external-line connector;

means for providing an instruction for external-line connection to the private branch exchange via the extension-line connector, when both of the first and second judgments are affirmative; and means for effecting the first communication with the first external station via one of the plurality of communication control units which is not in use, the extension-line connector, and the private branch exchange.

2. The apparatus according to claim 1, wherein the instruction for external-line connection is a number "0".

3. The apparatus according to claim 1, further comprising means for storing abbreviated dialing numbers of extension stations and external stations, each of the abbreviated dialing numbers including an extension/external-line identification code, wherein the first judgment is made according to the extension/external-line identification code of the first communication being attempted.

4. A communication apparatus comprising:

a plurality of communication control units for transmitting a communication;

an external-line connector connected to external lines;

an extension-line connector connected to a private branch exchange;

means for making a first judgment of whether a first communication is directed to an external station;

means for making a second judgment, in the event said first judgment is affirmative, of whether a communication is being conducted via said external-line connector;

means for connecting, in the event said second judgment is affirmative, said private branch exchange to said external lines; and means, responsive in the event said second judgment is affirmative, for connecting a selected one of said communication control units not in use to said private branch exchange via said extension-line connector, and for transmitting said first communication via the selected communication control unit to transmit said first communication to said external station.

5. A communication apparatus according to claim 4, further comprising means, responsive in the event said second judgment is negative, for connecting a selected one of said communication control units not in use to said external lines via said external-line connector, and for transmitting said first communication via the selected communication control unit to transmit said first communication to said external station.

6. A communication apparatus according to claim 4, further comprising means for transmitting a number "0" to said private branch exchange via said extension-line connector, in the event said second judgment is affirmative, wherein said means for connecting said private branch exchange to said external lines operates in response to said number "0".

7. A communication apparatus according to claim 4, further comprising means for storing abbreviated dialing numbers of extension stations and external stations, each of the abbreviated dialing numbers including an extension/external-line identification code, wherein the first judgment is made according to the extension/external-line identification code of the first communication.

8. A communication apparatus comprising:

a plurality of communication control units for transmitting a communication;

an external-line connector connected to external lines;

an extension-line connector connected to a private branch exchange;

means or making a first judgment of whether a first communication is directed to an external station;

means for making a second judgment, in the event said first judgment is affirmative, of whether a communication is being conducted via said external-line connector;

means for making a third judgment, in the event said second judgment is affirmative, of whether a communication is being conducted via said extension-line connector;

means for repeating said third judgment at predetermined time intervals until said third judgment is negative;

means for connecting, in the event said third judgment is negative, said private branch exchange to said external lines; and means, responsive in the event said third judgment is negative, for connecting a selected one of said communication control units not in use to said private branch exchange via said extension-line connector, and for transmitting said first communication via the selected communication control unit to transmit said first communication to said external station.

9. A communication apparatus according to claim 8, further comprising means, responsive in the event said second judgment is negative, for connecting a selected one of said communication control units not in use to said external lines via said external-line connector, and for transmitting said first communication via the selected communication control unit to transmit said first communication to said external station.

10. A communication apparatus according to claim 8, further comprising means for transmitting a number "0" to said private branch exchange via said extension-line connector, in the event said third judgment is negative, wherein said means for connecting said private branch exchange to said external lines operates in response to siad number "0".

11. A communication apparatus according to claim 8, further comprising means for storing abbreviated dialing numbers of extension stations and external stations, each of the abbreviated dialing numbers including an extension/external-line identification code, wherein the first judgment is made according to the extension/external-line identification code of the first communication.

* * * * *

UNITED STATES PATENT AND TRADEMARK OFFICE
CERTIFICATE OF CORRECTION

PATENT NO. : 5,191,604
DATED : March 02, 1993
INVENTOR(S) : Nobuyuki Shigeeda

It is certified that error appears in the above-indentified patent and that said Letters Patent is hereby corrected as shown below:

Abstract, Title page line 10 change "attampted" to -- attempted--.

Claim 8, column 8, line 17, change "or" to --for--.

Claim 10, column 8, line 50, change ""0"" to --"0"--.

Signed and Sealed this

Eighteenth Day of January, 1994

Attest:

BRUCE LEHMAN

Attesting Officer    Commissioner of Patents and Trademarks